United States Patent [19]

Hart

[11] Patent Number: 5,429,426

[45] Date of Patent: Jul. 4, 1995

[54] BRAKE CYLINDER PRESSURE RELAY VALVE FOR RAILROAD FREIGHT CAR

[75] Inventor: James E. Hart, Trafford, Pa.

[73] Assignee: Westinghouse Air Brake Company, Wilmerding, Pa.

[21] Appl. No.: 220,568

[22] Filed: Mar. 31, 1994

[51] Int. Cl.$^6$ .............................................. B60T 15/22
[52] U.S. Cl. .......................................... 303/33; 303/7; 303/40; 303/DIG. 2
[58] Field of Search .................... 303/7, 28, 30, 33, 35, 303/36, 39, 40, 81-83, DIG. 1, DIG. 2

[56] References Cited

U.S. PATENT DOCUMENTS

| | | | |
|---|---|---|---|
| 3,443,839 | 5/1969 | Hinrichs et al. | 303/40 X |
| 3,443,841 | 5/1969 | Kobnick | 303/40 X |
| 3,597,013 | 8/1971 | Shah | 303/40 X |
| 4,586,755 | 5/1986 | Worbois | 303/28 |

Primary Examiner—Robert J. Oberleitner
Assistant Examiner—Alfred Muratori
Attorney, Agent, or Firm—Gary J. Falce

[57] ABSTRACT

A relay valve device for a relayed type brake system in which the compressed air of the auxiliary reservoir is connected to an equalizing reservoir instead of directly to the brake cylinder, as in a conventional system. Since the equalizing reservoir volume is fixed, as compared to the brake cylinder volume which varies with piston displacement, the equalizing reservoir volume must be greater than the final brake cylinder volume in order to obtain a full equalization pressure that matches the full service application pressure in a conventional brake system. The relay valve device employs a control piston that is subject opposingly to the equalizing reservoir pressure and the effective brake cylinder pressure delivered by the relay valve device. A differential pressure area of the control piston is selected in accordance with the volumetric ratio between the auxiliary and equalizing reservoirs so that the buildup of brake pressure substantially matches the conventional system partial application pressures, as well as full equalization pressure. A bias spring acts on the control piston to delay its actuation so as to cause the relayed pressure buildup to correspond in time to the conventional system brake pressure buildup.

14 Claims, 2 Drawing Sheets

BRAKE CYLINDER PRESSURE RELAY VALVE FOR RAILROAD FREIGHT CAR

BACKGROUND OF THE INVENTION

The existing conventional freight brake system used on railroads in North America for freight cars utilizes a combination "AB" reservoir, having an auxiliary reservoir volume of 2500 cubic inches for service braking and an emergency reservoir volume of 3500 cubic inches for a combined total of 6000 cubic inches for emergency brake applications. The "AB" type control valves, including ABD, ABDW, and ABDX valves, as well as DB-60 control valves, all operate to produce brake cylinder pressure on each car of a train by causing the auxiliary reservoir pressure to be reduced by the same general amount as the train brake pipe pressure is reduced and by directing the air thus released from the reservoir to the brake cylinder. For full service applications, brake pipe pressure is generally reduced by an amount sufficient to allow the auxiliary reservoir pressure to equalize with the brake cylinder pressure, thereby providing the maximum service brake available from a given initial brake pipe pressure. For emergency brake applications, brake pipe pressure is quickly reduced to atmospheric pressure, and both the auxiliary and emergency reservoir pressures equalize with the brake cylinder pressure. This produces a brake cylinder pressure 15% to 20% higher than full service pressure.

The brake cylinder pressure derived for any brake application is therefore somewhat dependent on the initial and final brake cylinder volumes.

Initially, with the brakes unapplied and the brake piston retracted in release position, the brake cylinder piping and clearance volume is at atmospheric pressure (14.7 psi). When the brakes are applied, this initial volume is expanded by the piston displacement volume (piston area multiplied by piston stroke), as the piston is driven out through the brake cylinder. During piston displacement, the forward side of the piston is essentially voided of atmospheric pressure, causing it to behave as a vacuum. Therefore, on a per cubic inch basis, the effect of the volume displaced by the piston has a greater impact on the resultant brake cylinder pressure than does the brake cylinder clearance and piping volume.

In general terms, the clearance and pipe volume for a conventional freight car having a body mounted brake cylinder is approximately 120 cubic inches, and the piston displacement volume is about 630 cubic inches. The initial cylinder volume on the pressure side of the piston is therefore 120 cubic inches, and the final volume is approximately 750 cubic inches.

Knowing the auxiliary reservoir volume and the initial and final brake cylinder volumes, brake cylinder pressure can be calculated, simply using the principles of Boyle's Law.

For service reductions:

$$2500 \cdot Pi + 14.7 \cdot Vc = 2500\,(Pi - R) + Pc\,(Vc + Vd) \qquad (1)$$

Where:
 $Pi$ = Initial reservoir pressure (psia)
 $Pc$ = Brake cylinder pressure (psia)
 $R$ = Pressure reduction in brake pipe and reservoir (psi)
 $Vc$ = Brake cylinder clearance and piping volume (cubic inches)
 $Vd$ = Piston displacement volume (cubic inches)

This can be reduced, as follows:

$$2500 \cdot R = Pc\,(Vc + Vd) - 14.7 \cdot Vc \qquad (2)$$

Letting $Vc = 120$ cubic inches and $Vd = 630$ cubic inches $$2500R = 750Pc - 1764 \qquad (3)$$

$$Pc = 3.33R + 2.35 \qquad (4)$$

$$Pc(gage) = 3.33R + 2.35 - 14.7 \text{ or } 3.33R - 12.35 \qquad (5)$$

In general, then, gage brake cylinder pressure for a service reduction with conventional brake equipment can be expressed as $Pcg = 3.33R - 12.35$, where $R$ is pressure reduction from the auxiliary reservoir.

For full service equalization, the equalization equation can be written as:

$$Pi \cdot 2500 + 14.7\,Vc = Pe\,(2500 + Vc + Vd) \qquad (6)$$

where:
 $Pe$ = Reservoir & Brake Cylinder equalization pressure (psia)

Using the standard volumes, this equation reduces to:

$$2500 \cdot Pi + 1764 = 3250 \cdot Pe \qquad (7)$$

$$Pe(gage) = 0.769\,Pi - 14.157 \qquad (8)$$

For Emergency applications:

$$Pi \cdot 6000 + 14.7 \cdot Vc = Pem\,(6000 + Vc + Vd) \qquad (9)$$

and, $$6000 \cdot Pi + 1764 = 6750 \cdot Pem \qquad (10)$$

reducing to:

$$Pem(gage) = 0.8889 Pi - 14.439 \qquad (11)$$

where:
 $Pem$ = Emergency brake cylinder pressure (psi)

Because the conventional system relies directly on the relationship of the reservoir and brake cylinder volumes, the actual brake cylinder pressure on each car can vary as a result of having somewhat different brake cylinder piston strokes and piping arrangements on such cars.

One method of compensating for this condition and obtaining generally equal brake cylinder pressures, irrespective of piston travel or piping volume variations, is by using a fixed equalizing volume and a relay valve to supply the actual brake cylinder pressure. Such systems are hereinafter referred to as relayed systems.

In such a relayed system the control valve output from the reservoirs is fed to a fixed volume equalizing reservoir, not having a moving piston, and the pressure in this equalizing reservoir is used to supply a control pressure to a conventional relay valve. The relay valve simply causes a separate supply reservoir to feed as much air pressure to the brake cylinder as is required for the brake cylinder pressure to match the control pressure, irrespective of the actual volume of the brake cylinder. One such relayed system is shown in FIG. 1 of the drawings.

Conventional pneumatic relay valves are generally proportional, where the output pressure is either equal to or a fixed proportion of the control pressure. With conventional relay valves, however, it is not possible to derive output pressures which match the brake cylinder pressure of the conventional brake system for the full range of service reductions and also service and emergency equalizations. This is due to the fact that the actual brake cylinder has the movable piston that creates a voided displacement volume, whereas the aforementioned fixed equalizing reservoir volume in a relayed system does not have a movable piston.

Graphically, FIG. 2 shows the brake cylinder pressure, Pe, versus reservoir reduction for a fixed equalizing reservoir volume and a characteristic brake cylinder pressure curve, Pc, for a brake cylinder as typically employed in "AB" type brake systems. The 3.7 psi reduction to derive zero (gage) brake cylinder pressure indicates that a pressure reduction of 3.7 psi is required from the 2500 cubic inch auxiliary reservoir to pressurize the voided 630 cubic inch piston displacement volume to atmospheric pressure (14.7 psia, or 0 psig). This corresponds to 12.3 psi buildup in the pressure Pe of a fixed volume equalizing reservoir. With no such displacement volume, the pressure buildup in a fixed volume equalizing reservoir begins at the first incremental reduction above zero reduction. The slope of this line is determined directly by the ratio of the auxiliary reservoir and equalizing reservoir volumes. It can be shown that the general equation for the pressure buildup in a fixed volume equalizing reservoir, when supplied from another pressurized reservoir, is:

$$Pe(gage) = R \ (Vs/Vfe) \qquad (12)$$

Where:
R is supply reservoir pressure reduction (psi)
Vs = Supply reservoir volume (cubic inches)
Vfe = fixed equalizing reservoir volume (cubic inches)

In a relay valve which utilizes the pressure in a fixed volume equalizing reservoir as a control pressure and feeds air pressure from a supply reservoir to one or more brake cylinders having a movable piston, one element which can be added to allow the output of such a relay to better match the brake cylinder pressure of the described conventional brake system for any given pressure reduction is an offsetting spring.

The load of this spring can be set such that it balances approximately 12.3 psi acting on the effective area of the relay valve control piston when the supply valve is positioned right at its opening point, since the brake cylinder pressure in a conventional system would in essence be 12.3 psi higher for any given reduction if the piston displacement volume were pressurized to atmospheric pressure to begin with.

In its simplest form, such a relay valve, having the 12.3 psi offsetting spring, will generally match the desired brake cylinder pressures for partial service reductions when used in a system where the brake control valve uses an auxiliary reservoir having a volume of 3.33 times the volume of the fixed volume equalizing reservoir.

In such a relayed system, this volumetric ratio matches the nominal ratio of the auxiliary reservoir and final brake cylinder volume of a conventional system, thereby obtaining the proper slope of brake cylinder pressure versus reduction, and the spring in the relay valve shifts the brake cylinder output by 12.3 psi below the equalizing reservoir control pressure Pe to generally match the desired brake cylinder pressure that would be obtained with a conventional system. This offset spring is included in the relay valve of the present invention.

Making the ratio of volumes in a relayed system match the volumetric ratio of the auxiliary reservoir and brake cylinder in a conventional system and utilizing the proper offset spring, however, only assures that the brake cylinder relay valve will provide compatible operation with a conventional brake system on railroad cars during partial service reductions. Without the effect of a voided piston displacement volume consuming a certain amount of reservoir air to charge it to atmospheric pressure, a fixed volume auxiliary reservoir and fixed volume equalizing reservoir will not equalize at the same pressures as the conventional system from any initial pressure, and the described relay valve, even with the offset spring, will therefore not provide proper full service or emergency brake cylinder pressures.

SUMMARY OF THE INVENTION

It is an object of the present invention to provide a novel relay valve device for use in a relayed type railroad car brake system that is capable of more closely matching the brake cylinder pressure produced by a conventional railroad car brake system for any given brake application, including partial service application as well as full service and emergency brake applications.

Briefly, this objective is achieved by a novel relay valve device for use in relayed type brake systems in which a pressurized auxiliary reservoir supplies air to an equalizing reservoir, as opposed to the car brake cylinder as in a conventional brake system. The equalizing reservoir pressure in turn causes the relay valve to feed pressurized air from a supply reservoir to the car brake cylinders at a pressure proportional to the equalizing reservoir pressure. The novel relay valve device incorporates compensating means in the form of a bias spring and a differential control piston that is specifically matched relative to the volumetric ratio between the auxiliary and equalizing reservoirs, which volumetric ratio is less than the ratio between the auxiliary reservoir and final brake cylinder volumes in a conventional brake system, in order that the relayed brake system brake cylinder pressure substantially matches the designed brake cylinder pressure of an ideal conventional brake system for any corresponding degree of brake application, irrespective of such variables as actual brake cylinder piston travel and/or piping volume.

BRIEF DESCRIPTION OF THE DRAWINGS

This and other objects and advantages of the invention will become apparent from the following more detailed description when taken in conjunction with the accompanying drawings in which.

DESCRIPTION AND OPERATION

Figure 1:
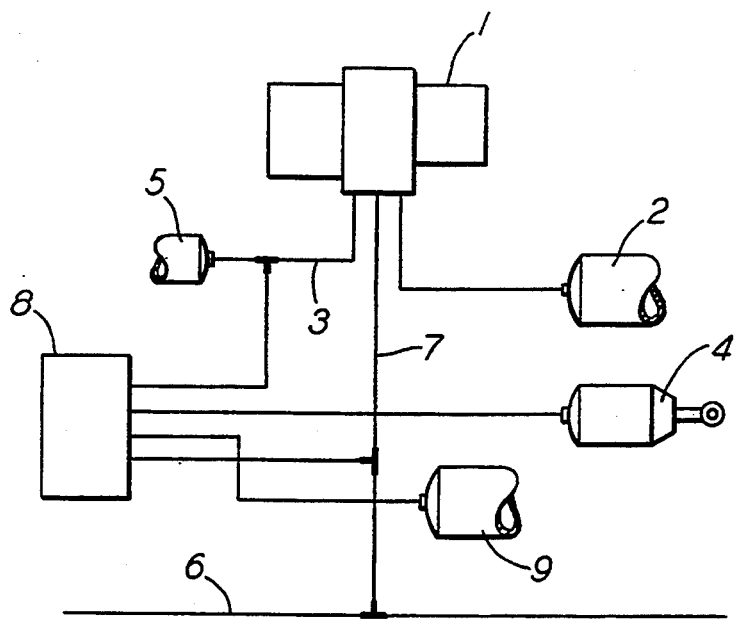
FIG. 1 is a schematic view of one known relayed type railroad car brake system.

Referring now to FIG. 1, the relayed brake system shown includes a brake control valve device 1, a 2,500 cu. in. auxiliary reservoir 2, and a brake cylinder device 4 having a 120 cu. in. clearance volume (including the piping volume) and a 630 cu. in. displacement volume resulting in a 750 cu. in. total brake cylinder volume. The foregoing devices correspond to such devices as are employed in a conventional "AB" brake system, as is well-known. The relayed brake system of FIG. 1 further includes an equalizing reservoir 5 having a fixed volume to which the auxiliary reservoir air is connected via the control valve device 1 and pipe 3, in response to a reduction of pressure in the brake pipe 6 to which the control valve is connected via a branch pipe 7. Also included in the relayed brake system is a relay valve device 8 and a supply reservoir 9 that may be charged with compressed air (not shown) from the brake pipe to provide a source of pressure for actuating the brake cylinder device 4.

Figure 3:
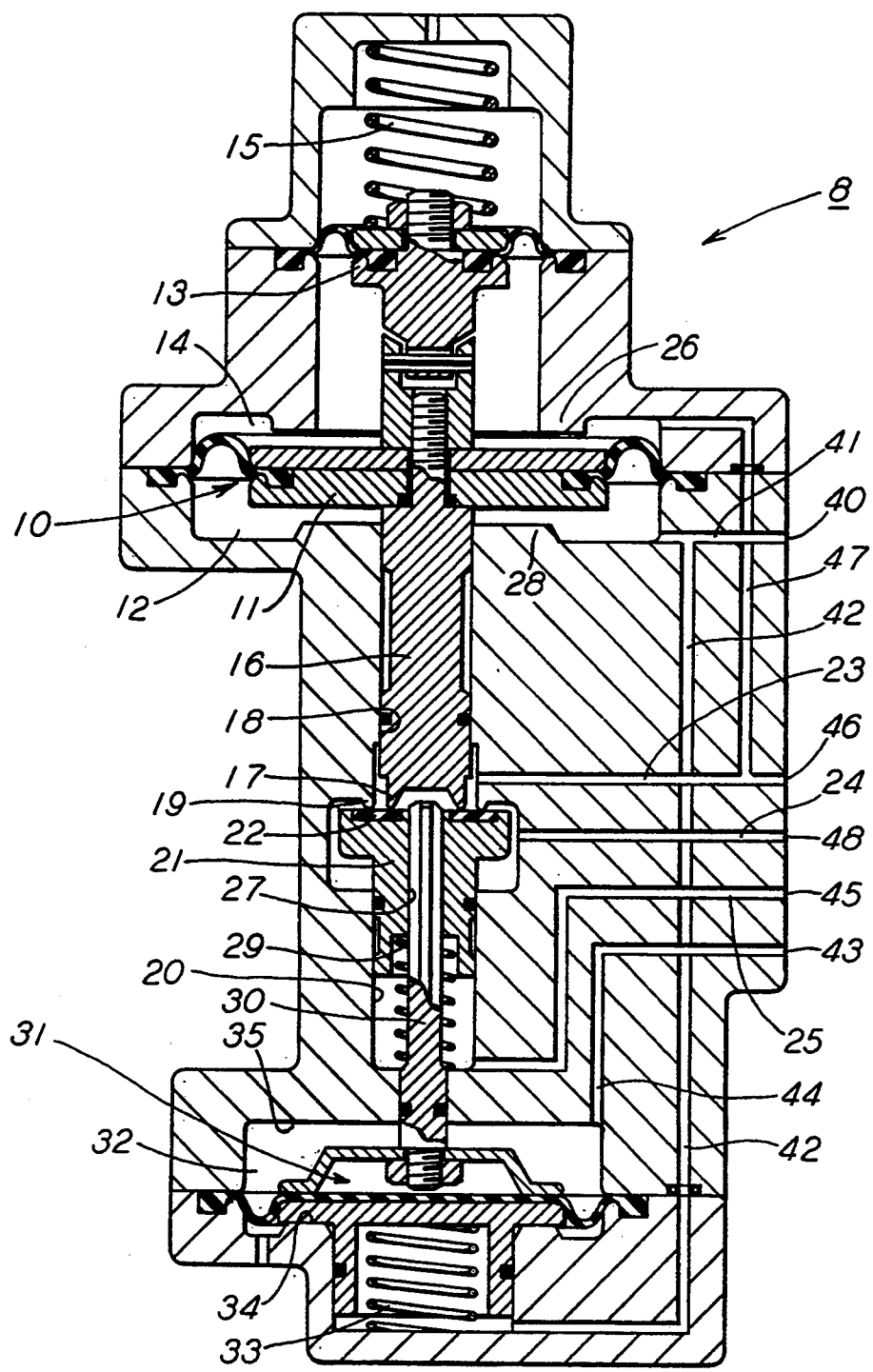
FIG. 3 is a sectional view of a novel relay valve device as may be employed in the relayed brake system of FIG. 1 and incorporating features of the present invention.

As shown in FIG. 3 and in accordance with the present invention, relay valve device 8 includes a main piston assembly 10 comprising a control piston 11 and a displacement compensating piston 13. Control piston 11 forms on one side, in conjunction with the valve body, a control chamber 12, and on the opposite side, in conjunction with the valve body and compensating piston 13, a feedback chamber 14. The relative effective pressure areas of main control piston 11 and displacement compensating piston 13 subject to pressure in chamber 14 are unequal for a reason hereinafter explained. An offsetting bias spring 15 is located between piston 13 and a cover on the valve body to urge the piston assembly 10 in a downward direction. Connected to the main piston assembly at control piston 11 is a service actuator stem 16 having an annular supply valve seat 17 formed on its end. Stem 16 is guidably disposed in a bore 18 that terminates in an annular exhaust valve seat 19 having surrounding relationship with valve seat 17. Another bore 20 that is coaxial with bore 18 receives a movable valve member 21 having an elastomeric valve element 22 at one end adjacent the respective valve seats 17, 19. A light spring 29 exerts an upward force on the opposite end of valve member 21 in the direction of engagement of valve element 22 with valve seats 17 and 19, such valve engagement corresponding to lap position, as shown. In this lap position, a delivery passage 23 is cut off from an exhaust passage 24 by engagement of valve element 22 with exhaust valve seat 19, while concurrently, engagement of valve element 22 with supply valve seat 17 cuts off delivery passage 23 from a supply passage 25.

A stop 26 is provided on the valve body to limit upward movement of the piston assembly in an application position in which supply valve seat 17 is disengaged from valve element 22 without valve element 22 becoming disengaged from exhaust valve seat 19. In this application position, delivery passage 23 is connected to supply passage 25 via the open supply valve and a central bore 27 in valve member 21, while exhaust passage 24 continues to be cut off from delivery passage 23 by closure of the exhaust valve. Similarly, downward movement of the piston assembly is limited by a stop 28 on the valve body to establish a release position in which valve member 21 is forced downwardly by stem 16 to disengage valve element 22 from exhaust valve seat 19.

In this release position, delivery passage 23 is connected to exhaust passage 24 via the open exhaust valve, while concurrently supply valve seat 17 remains engaged with valve element 22 to maintain closure of the supply valve and thereby cut off supply passage 25 from delivery passage 23.

A fluted emergency actuator stem 30 is operatively disposed in central bore 27 of valve member 21, one end of stem 30 being connected to an emergency high pressure actuating piston 31 that forms, in conjunction with the valve body, a high pressure chamber 32 on its upper side and a pilot chamber 33 on its under side. A stop 34 formed on the valve body limits the downward movement of piston 31 to establish a service position in which piston 31 is normally maintained by reason of the pressure in the respective chambers 32, 33 acting on a differential pressure area of piston 31. The active end 34 of emergency stem 30 is adapted to project through the end of valve member 21 within the annulus of valve seat 17 for engagement with service stem 16. When emergency high pressure actuating piston 31 is in its uppermost emergency position, as established by engagement of piston 31 with a stop 35 formed by the valve body, emergency stem 30 deflects service stem 16 sufficiently to disengage supply valve seat 17 from valve element 22. In service position of piston 31, the active end 34 of emergency stem 30 is displaced from service stem 16 sufficiently to accommodate movement of the main control piston between its application and release positions.

Relay valve device 8 is further provided with a control port 40 via which the equalizing reservoir 5 is connected to a control passage 41 leading to control chamber 12; a branch passage 42 via which pilot chamber 33 is connected to control passage 41; a port 43 via which brake pipe branch 7 is connected to a passage 44 leading to high pressure chamber 32; a port 45 via which supply reservoir 9 is connected to supply passage 25 leading to the underside of valve member 21; a port 46 via which brake cylinder device 4 is connected to delivery passage 23; an internal feedback passage 47 between passage 23 and chamber 14; and a port 48 via which exhaust passage 24 is vented to atmosphere.

When a service brake application is called for incident to a reduction of brake pipe pressure, control valve device 1 operates to connect compressed air stored in auxiliary reservoir 2 to equalizing reservoir 5 and to relay valve port 40. From port 40, the equalizing reservoir air is connected via passage 41 to control chamber 12 and via passage 42 to pilot chamber 33. In that brake pipe pressure is supplied from branch pipe 7 and passage 44 to high pressure chamber 32 so as to act on a greater area of the emergency high pressure actuating piston than the area subject to pilot pressure in chamber 33, this piston 32 is maintained in its lower-most, service position during service reductions of brake pipe pressure and thus is withheld from acting on the main control piston 11 through emergency actuator stem 30.

During the initial buildup of equalizing reservoir pressure effective in control chamber 12, the offsetting bias spring 15, acting through displacement compensating piston 13, maintains the main control piston 11 engaged with stop 28 in its lower-most release position. Consequently, service actuator stem 16 is engaged with valve member 21 to effect closure of supply valve 17-22, while concurrently holding the exhaust valve 19-22 open. Accordingly, no brake cylinder pressure is obtained during this initial service reduction of brake pipe pressure, until the force exerted by spring 15 is overcome.

Figure 2:
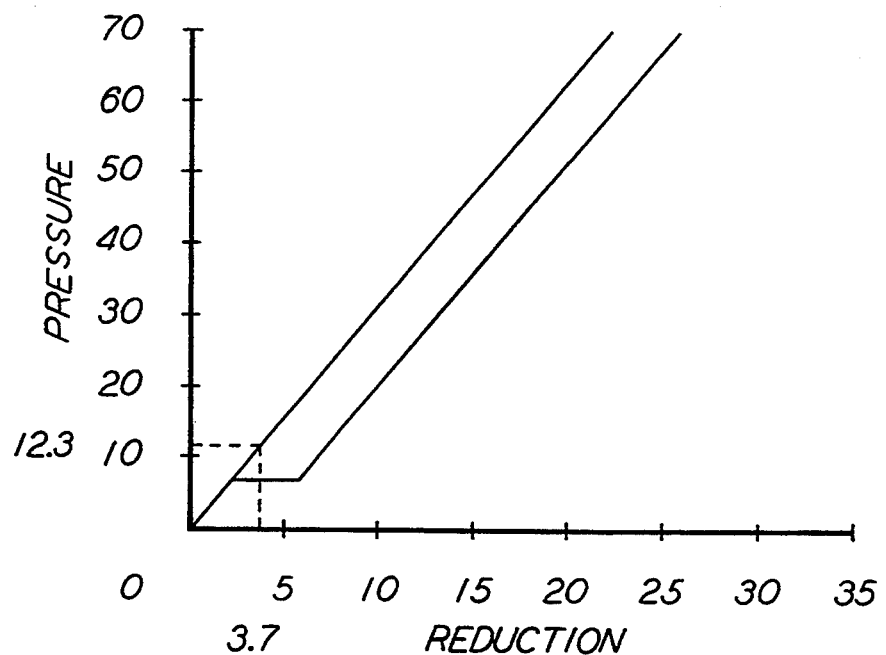
FIG. 2 is a graph showing a representative brake cylinder pressure for a fixed volume equalizing reservoir such as is typically employed in a relayed type brake system along with a brake cylinder pressure for a brake cylinder such as is typically employed in a conventional brake system for a railroad car, both based on reservoir pressure reduction.

As previously discussed, delaying the buildup of brake cylinder pressure in this manner has the effect of compensating for the lag P1 in a conventional brake cylinder pressure buildup Pc due to piston displacement, as shown in FIG. 2.

When the pressure buildup in equalizing reservoir 5 and control chamber 12 is sufficient to overcome the force exerted by spring 15, piston assembly 10 is forced to application position, opening supply valve 17-22 to allow supply reservoir air in passage 25 to flow to brake cylinder 4 via delivery passage 23. This air supplied to the brake cylinder thus corresponds to the pressure buildup curve Pc and also flows to compensating chamber 14 via feedback passage 42 to counteract the control pressure effective in chamber 12. This causes the main piston assembly to return to lap position in which the brake cylinder supply is cut off when the desired brake cylinder pressure is obtained depending upon the level of pressure that is supplied from auxiliary reservoir 2 to equalizing reservoir 5 via control valve device 1 in response to the brake pipe pressure reduction in effect.

When a full service reduction of brake pipe pressure is made, control valve 1 allows full pressure equalization between auxiliary reservoir 2 and equalizing reservoir 5. Accordingly, full brake cylinder pressure is developed by relay valve device 8. As previously discussed, however, this full brake cylinder pressure when developed by a relayed brake system is higher than full service brake cylinder pressure developed by a conventional brake system, since the pressure developed in equalizing reservoir 5 is not influenced by piston displacement, as is a brake cylinder device. This is due to the fact that, in the case of a conventional brake cylinder device, the displacement volume created by piston movement is initially absent atmospheric pressure, which therefore must be made up from the auxiliary reservoir. The net result is a lower equalization pressure than in the case of pressure equalization between corresponding volumes having no piston displacement to influence the equalization pressure.

It can be shown that:

$$Pef(gage) = 0.769Pi - 11.31 \qquad (13)$$

Where Pef is the equalizing gage pressure for a fixed volume equalizing reservoir having a volumetric ratio with the auxiliary reservoir of 3.33:1.

Comparing equations (8) and (13), it is clear that with a fixed volume equalizing reservoir, full pressure equalization will always be approximately 2.85 psi higher than the conventional brake equipment having a brake cylinder with nominal piston displacement of 630 cu. in.

Since it is important to match the brake cylinder pressures of conventional railroad cars for full service applications (equalization) for any initial operating pressure, particularly from 75 psi to 90 psi, where most railroads operate today, the aforementioned difference in equalization pressures between relayed brake systems and conventional brake systems represents a special case problem. In order to better match the conventional system brake cylinder equalization pressures in the desired operating pressure range, it is necessary to use a ratio of volumes similar to that which would be required in order for the fixed volume system equalization to match the conventional system equalization pressure at this selected initial pressure in the midsection of this range. The equalizing reservoir/auxiliary reservoir volume ratios required to achieve this are approximately as follows:

| Initial Pressure psig | Conventional System Equalizing Pressure psig | Relayed System Fixed Volume Ratio |
|---|---|---|
| 70 | 51.0 | 2.684:1 |
| 80 | 58.7 | 2.756:1 |
| 85 | 62.5 | 2.784:1 |
| 90 | 66.4 | 2.813:1 |
| 100 | 74.1 | 2.857:1 |
| 110 | 81.8 | 2.896:1 |

Selecting a nominal volume ratio of 2.78:1 would match equalization pressures for an initial pressure of approximately 84 psi, which is believed to be about the average operating brake pipe pressure on North American railroads today. Any desired volumetric ratio may be selected, but further analysis will be based upon 2.78:1, as representing a reasonable example.

It will be appreciated, however, that in changing the volumetric ratio to achieve the desired result of matching equalization pressures between the relayed and conventional brake systems, the slope of the pressure buildup curve also changes and consequently, partial brake application pressure for any given brake pipe reduction short of a full service (equalization) in the relayed system would differ from that of a conventional brake system. It is for this purpose that the main piston assembly 10 of relay valve device 8 comprises a differential piston having different effective pressure areas A1 and A2. Area A1 is the area of control piston 11 subject to control pressure effective in chamber 12, while A2 is the difference between the area of control piston 11 and compensating piston 13 subject to the pressure effective in feedback chamber 14. The general pressure balance equation for relay valve device 8 can be expressed as follows:

$$A1 \cdot Pcon = A2 \cdot Pd + S \qquad (14)$$

Where:
Pcon = control pressure in psig
Pd = Delivery Pressure to brake cylinder in psig
S = Spring force in pounds
A1 = Effective area under diaphragm piston 11, acted upon by control pressure Pcon, in square inches
A2 = Effective area difference between diaphragm piston 11 and diaphragm piston 13, as acted upon by output pressure Pd Transforming equation (14) yields:

$$Pd = \frac{A1 \cdot Pcon - S}{A2} \qquad (15)$$

The control pressure, Pcon, is dependent on the ratio between the auxiliary and equalizing reservoir volumes and on the auxiliary reservoir reduction, R, as expressed in equation (12)

Substituting 2.78 for the ratio Vs/Vfe in (12) yields:

$$Pcon = 2.78\ R \qquad (16)$$

Combining (15) and (16), yields:

$$Pd = 2.78 R \cdot A1/A2 - S \text{ or} \tag{17}$$

$$A1/A2 = \frac{(Pd + S)}{R \cdot Vs/Vfe} \tag{18}$$

By choosing two specific desired brake cylinder pressures, Pd, for two given reductions R, substituting in (19), setting A1 arbitrarily to 6.0 in.$^2$ and solving these simultaneously yields:

$$Pd = 1.2 \cdot Pcon - 12.3 \tag{20}$$

In thus making the differential area A1 1.2 times greater than the area A2 of main piston assembly 10, the brake cylinder pressure delivered by relay valve device 8 closely matches the nominal brake cylinder pressure obtained with a conventional brake system, for partial as well as full service applications, when the auxiliary/equalizing reservoir volumetric ratio in 2.78:1. A comparison of the fixed volume, relayed system brake pressures with a conventional brake system brake pressures is shown in the following chart:

| Service Application | Relayed B C P | Conventional B C P | Difference |
|---|---|---|---|
| 6.7 psi Reduction | 10.0 psig | 10.0 psig | 0 psi |
| 10 psi Reduction | 21.0 | 21.0 | 0 |
| 15 psi Reduction | 37.8 | 37.7 | .1 |
| 20 psi Reduction | 54.4 | 54.4 | 0 |
| 25 psi Reduction | 71.0 | 71.0 | 0 |
| 70 psi Full Service | 49.42 | 51.0 | −1.58 |
| 75 psi Full Service | 53.83 | 54.84 | −1.01 |
| 80 psi Full Service | 58.24 | 58.69 | −.45 |
| 85 psi Full Service | 62.65 | 62.54 | +.11 |
| 90 psi Full Service | 67.07 | 66.40 | +.67 |
| 100 psi Full Service | 75.95 | 74.07 | +1.88 |
| 110 psi Full Service | 84.72 | 81.80 | +2.92 |

In the primary operating range of 75 psig to 90 psig, the resultant full service brake pressures of the relayed system having relay valve device 8 are quite close to the desired values obtained in a conventional brake system, and they are also precisely correct for any partial service reduction.

When it is desired to make an emergency brake application, an emergency reservoir is connected by the car control valve device to the brake cylinder in conventional brake systems.

Equation (11) represents the emergency brake cylinder pressure provided by the conventional brake equipment, having a 3500 cubic inch emergency reservoir.

| Initial Pressure | Emergency B C P | Ratio Em/F.Service |
|---|---|---|
| 70 psig | 60.85 psig | 1.19:1 |
| 90 | 78.63 | 1.18:1 |
| 110 | 96.41 | 1.18:1 |

The federal Power Brake Law requires that the ratio of emergency to full service brake cylinder pressure be between 1.15:1 and 1.20:1. This is specified for operation at 70 psig initial pressure.

If a fixed equalizing reservoir volume of approximately 900 cubic inches is used with conventional auxiliary and emergency reservoirs of 2500 and 3500 cubic inches, respectively, (Auxiliary reservoir volume to equalizing reservoir volume ratio of 2.78:1) the emergency equalization brake cylinder pressures would exceed the full service equalization, in the higher end of the brake pipe pressure range, by more than 20%.

The emergency high pressure actuating piston 31 causes relay valve device 8 of the present invention to produce proper emergency brake cylinder pressure without utilizing an emergency reservoir. When the reduction of brake pipe pressure is greater than a predetermined value, such as 25–30 psi, the pilot pressure effective in chamber 33 acting on the smaller differential area of piston 31 exerts sufficient force to overcome the opposing force of brake pipe pressure in chamber 32 acting on the larger differential area of piston 31. This pilot pressure corresponds to the equalizing reservoir pressure effective in control chamber 11 and forces piston 31 to its emergency position in which emergency actuator stem 30 engages service actuator stem 16 to transmit a supplemental force to the main piston assembly 10, which acts in concert with the force exerted by the equalizing reservoir pressure effective in control chamber 12. This supplemental emergency force is determined by the full service equalization pressure provided by equalizing reservoir 5 acting on the smaller differential area of piston 31. Thus, by proper selection of the effective pressure area of piston 31, the emergency brake application pressure is increased over full service equalization by a predetermined fixed proportion, such as 18%.

Since the emergency function of relay valve 8, as above explained, requires no emergency reservoir pressure, where such an emergency reservoir exists, as when converting a conventional "AB" brake system to a relayed system having relay valve 8 (FIG. 1), the function of the control valve high pressure valve (not shown) should be nullified, as by plugging the high pressure output from this valve.

I claim:

1. A relayed type railway car brake system including a relay valve device, a brake pipe charged with fluid pressure of a certain chosen value, fluid pressure operated brake cylinder means, an auxiliary reservoir having a fixed volume charged with fluid at said certain chosen pressure, a control valve device, an equalizing reservoir having a fixed volume to which said auxiliary reservoir is connected via said control valve device in response to a reduction of said brake pipe fluid pressure, the volumetric ratio between said auxiliary and equalizing reservoirs being between 2.4:1 and 3.0:1, and a supply reservoir having a source of fluid under pressure, said relay valve device comprising:

a) a supply valve between said supply reservoir and said brake cylinder means;

b) a main piston assembly subject opposingly to said equalizing reservoir fluid pressure to urge movement of said main piston assembly in one direction to effect opening of said supply valve and to said brake cylinder fluid pressure to urge said main assembly in a direction opposite said one direction to effect closure of said supply valve; and c) compensating means for causing the effective fluid pressure of said brake cylinder means to substantially match the brake cylinder fluid pressure of a conventional railroad car brake system for any given brake application, said compensating means comprising:

(i) a bias spring acting on said main piston assembly in said opposite direction; and (ii) said main piston assembly including a first differential piston having a first effective pressure area subject to said equalizing reservoir fluid pressure and a second effective pressure area subject to said brake cylinder fluid pressure, the ratio of said first effective pressure area to said second effective pressure area being between 1.12:1 and 1.346:1.

2. A relay valve device as recited in claim 1, wherein said bias spring exerts a load of 12.3 lb. on said main piston assembly.

3. A relay valve device as recited in claim 2, wherein the ratio of said first and second pressure areas is substantially 1.2:1 when the ratio of said auxiliary and equalizing reservoir volumes is substantially 2.78:1.

4. A relay valve device as recited in claim 1, wherein the ratio of said first and second pressure areas is formed by the formula:

$$A1/A2 = \frac{(Pd + S)}{R \cdot Vs/Vfe}$$

where:
A1/A2 is the ratio of said first and second pressure areas;
Pd is said brake cylinder fluid pressure;
S is the force of said bias spring;
R is a reduction of said auxiliary reservoir fluid pressure; and
Vs/Vfe is the volumetric ratio of said auxiliary and equalizing reservoir.

5. A relay valve device as recited in claim 1, wherein said main piston assembly further includes a service actuator stem connected at one end to said first differential piston and having an annular supply valve seat formed at the other end thereof, said relay valve device further comprising an emergency piston assembly including:
a) a second differential piston subject on one side to said equalizing reservoir fluid pressure and on the other side to said brake pipe fluid pressure; and
b) an emergency actuator stem connected at its one end to said second differential piston and having the other end thereof in spaced-apart relationship with said other end of said service actuator stem so long as said brake pipe fluid pressure exceeds a predetermined value, said second differential piston of said emergency piston assembly being operative responsive to a reduction of said brake pipe fluid pressure below said predetermined value to cause said emergency actuator stem to engage said service actuator stem and effect movement thereof in said one direction to accordingly effect opening of said supply valve.

6. A relay valve as recited in claim 5, wherein said supply valve comprises:
a) a valve member having a central passage therein;
b) an annular valve element fixed to one end of said valve member, said emergency actuator stem being operatively disposed in said central passage such that said other end of said emergency actuator stem is engageable with said other end of said service actuator stem within the annulus of said supply valve seat.

7. A relay valve device as recited in claim 6, wherein said emergency actuator stem is fluted, the end of said valve member opposite said one end thereof being subject to fluid under pressure in said supply reservoir.

8. A method for converting a conventional railroad car brake system to a relayed type brake system wherein said conventional brake system includes a brake pipe charged with fluid at a certain chosen pressure, a piston actuated brake cylinder, an auxiliary reservoir charged with fluid at said certain chosen pressure and having a fixed volume substantially 3.33 times greater than a final volume of said brake cylinder, and a control valve device, there is provided an equalizing reservoir having a fixed volume, that is greater than said final volume of said brake cylinder, to which said auxiliary reservoir is connected via said control valve in response to a reduction of said brake pipe fluid pressure, a source of fluid under pressure, and a relay valve device comprising;
a) a supply valve between said source of fluid under pressure and said brake cylinder;
b) a main piston assembly subject opposingly to said equalizing reservoir fluid pressure to urge said main piston assembly in one direction to effect opening of said supply valve and to said brake cylinder fluid pressure to urge said main piston assembly in a direction opposite said one direction to effect closure of said supply valve; and
c) compensating means for causing said brake cylinder fluid pressure to substantially match the brake cylinder fluid pressure in said conventional brake system wherein said auxiliary reservoir is connected directly to said brake cylinder via said control valve for any given reduction of said brake pipe fluid pressure, said compensating means comprising:
(i) spring means for biasing said service piston assembly in said opposite direction; and
(ii) said main piston assembly including a first differential area piston subject opposingly to said equalizing reservoir fluid pressure and said brake cylinder fluid pressure, the greater effective pressure area of said first differential area piston being subject to said equalizing reservoir fluid pressure.

9. The method as recited in claim 8, wherein said spring means exerts a force on said piston assembly of 12.3 lbs. and the ratio of said differential area piston is between 1.12:1 and 1.346:1 when the volumetric ratio of said auxiliary and equalizing reservoirs is between 2.684:1 and 2.896:1.

10. The method as recited in claim 9, wherein the ratio of said differential area piston is 1.2:1 when the ratio of said auxiliary and equalizing reservoir volumes is 2.78:1.

11. The method as recited in claim 8, wherein the ratio of said first and second pressure areas is formed by the formula:

$$A1/A2 = \frac{(Pd + S)}{R \cdot Vs/Vfe}$$

where:
A1/A2 is the ratio of said first and second pressure areas;
Pd is said brake cylinder fluid pressure;
S is the force of said bias spring;
R is the reduction of said auxiliary reservoir fluid pressure; and
Vs/Vfe is the volumetric ratio of said auxiliary and equalizing reservoir.

12. The method as recited in claim 8, wherein said main piston assembly further includes a service actuator stem connected at one end to said first differential area piston and having an annular supply valve seat formed at the other end thereof, said relay valve device further comprising an emergency piston assembly including:
  a) a second differential piston subject on one side to said equalizing reservoir fluid pressure and on the other side to said brake pipe fluid pressure; and
  b) an emergency actuator stem connected at its one end to said second differential piston and having the other end thereof in spaced-apart relationship with said other end of said service actuator stem so long as said brake pipe fluid pressure exceeds a predetermined value, said second differential piston being operative responsive to a reduction of said brake pipe fluid pressure below said predetermined value to cause said emergency actuator stem to engage said service actuator stem and effect movement thereof in said one direction to accordingly effect opening of said supply valve.

13. The method as recited in claim 12, wherein said supply valve comprises:
  a) a valve member having a central passage therein;
  b) an annular valve element fixed to one end of said valve member, said emergency actuator stem being operatively disposed in said central passage such that said other end of said emergency actuator stem is engageable with said other end of said service actuator stem within the annulus of said supply valve seat.

14. The method as recited in claim 13, wherein said emergency actuator stem is fluted, the end of said valve member opposite said one end thereof being subject to fluid under pressure in said supply reservoir.

* * * * *